May 7, 1968 W. O. LINDNER ET AL 3,381,352
METHOD OF MAKING A VALVE ELEMENT
Filed Oct. 4, 1965 3 Sheets-Sheet 1
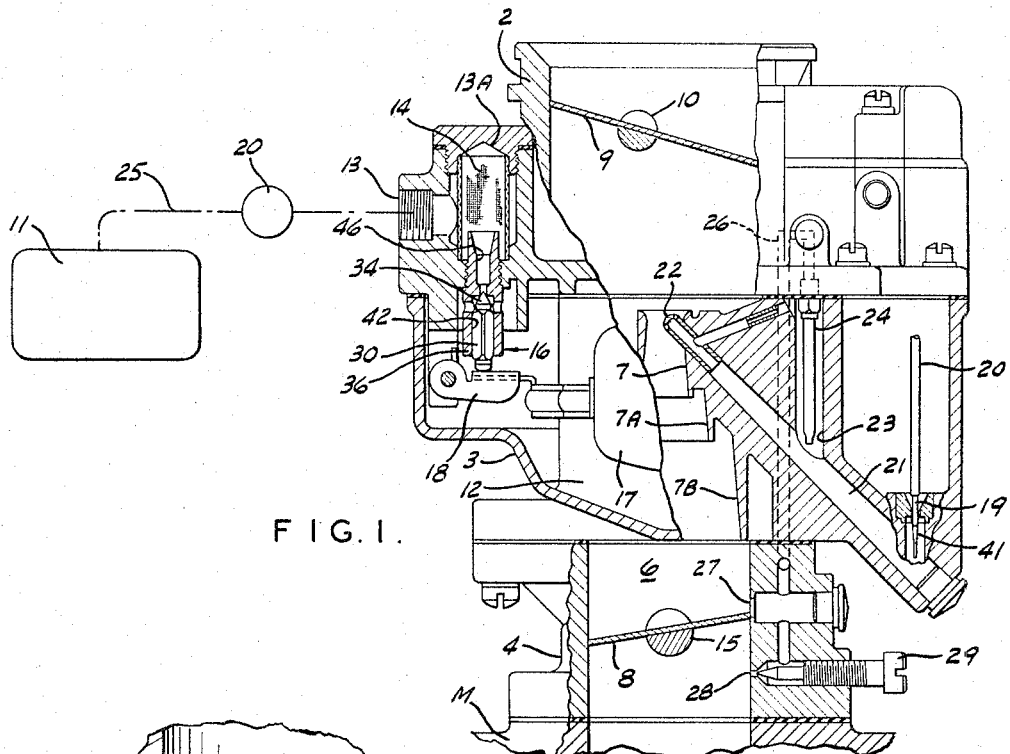
FIG. 1.
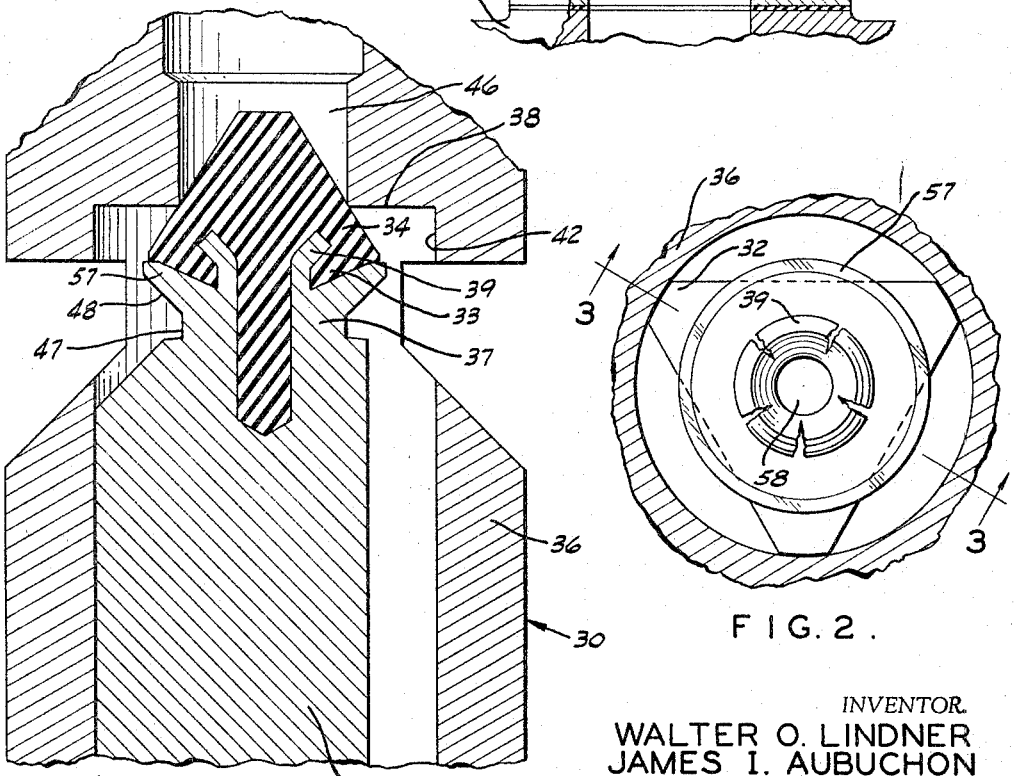
FIG. 3.
FIG. 2.
INVENTOR.
WALTER O. LINDNER
JAMES I. AUBUCHON
BY
Robert B. Burns
ATTORNEY 3,381,352
METHOD OF MAKING A VALVE ELEMENT
Walter O. Lindner and James I. Aubuchon, St. Louis, Mo., assignors to ACF Industries, Incorporated, New York, N.Y., a corporation of New Jersey
Filed Oct. 4, 1965, Ser. No. 492,563
10 Claims. (Cl. 29—156.7)

This invention relates to a novel method for forming a valve member and in particular to a resilient tipped needle valve member.

Conventional carburetors are provided with a constant level chamber having a float and needle valve assembly which functions to regulate the normal fuel level. While normally the valves of such assemblies are intended to be liquid-tight when closed, leakage does occur which tends to upset the proper operation of the carburetor and consequently the engine.

The use of a resilient tipped needle element to assure proper valve seating has been demonstrated successfully in many units. One such valve element is shown in U.S. Patent 3,086,750 dated Apr. 23, 1963. The valve element includes an elongated, preferably noncircular, metallic body, one end of which is formed to receive a rubber tip. It has been experienced when such rubber tipped needles are used, that often the resilient tip on becoming cured after molding, tends to separate from the metallic body and form an undesirable space. This propensity has been overcome at least in part by so forming the body socket to assure a firm anchorage for the resilient tip and yet avoid massiveness in the resilient material that will foster the above-noted separation from the socket.

One advantage flowing from the use of a resilient tipped needle of the type shown in U.S. Patent 3,086,750 resides in the greater versatility and more positive liquid fluid seal that might be obtained by use of a wide or flared tipped unit. However, in providing such a tip, normally a greater amount of molding material is necessitated thereby accentuating the above mentioned material distortion encountered due to shrinkage during the cure period.

One way to avoid such undesirable distortion and curing irregularities is to firmly and uniformly grip the resilient portion in such manner as to distribute the gripping forces. For example, to achieve this end, the use of a socket as shown in U.S. Patent 3,086,750 embodies a plurality of radially outwardly flared thin walled partitions. This flaring to form the needle socket accomplishes the dual purpose of firmly anchoring the inner end (tip) to the needle socket, and also maintaining the resilient material in close contact with the needle surface during the cure period.

Because of the minute size of the needle, and in particular the resilient tip, it is understandable that the forming of a suitable socket can become an engineering problem of no mean proportion. For example, in forming a suitable socket as shown in FIGURE 2 of U.S. Patent 3,086,750, the flared walls of the socket are dimensioned in the order of magnitude of approximately .115 inch, defining an annular space of approximately .023 inch. It has been found that for mass producing such a unit at the speeds on automatic equipment that are necessary to make the item commercially feasible, quite often the thin walls, particularly the outer wall, become cracked or damaged. Also, accurate alignment of the socket with the body is difficult. Further, because of the minute proportions of the respective walls and annular interspace, the rate of tool breakage can become noticeable. Thus, although the flare type resilient tipped needle embodies many desirable characteristics, its manufacture can present an undesired detriment both commercially and practically to its use on a large scale.

A principal object is to provide a method for fabricating a resilient tip needle body of the type generally described.

Still another object is to provide a method for fabricating a resilient tipped needle body of the type described, having a specially formed neck and socket portion within which the tip is retained.

The above-noted objects together with those not particularly enumerated will become clear from the following description of the invention made in conjunction with the drawings.

In the drawings,

FIGURE 1 is a cross sectional elevation view showing a single barrel carburetor in which the novel resilient tip valve element is employed.

FIGURE 2 is a segmentary top view on an enlarged scale of the needle valve element shown in FIGURE 1, with the needle resilient tip removed.

FIGURE 3 is a segmentary view in partial cross section of the needle valve and needle element, taken along line 3—3 in FIGURE 2, with the resilient tip in place.

Figure 4:
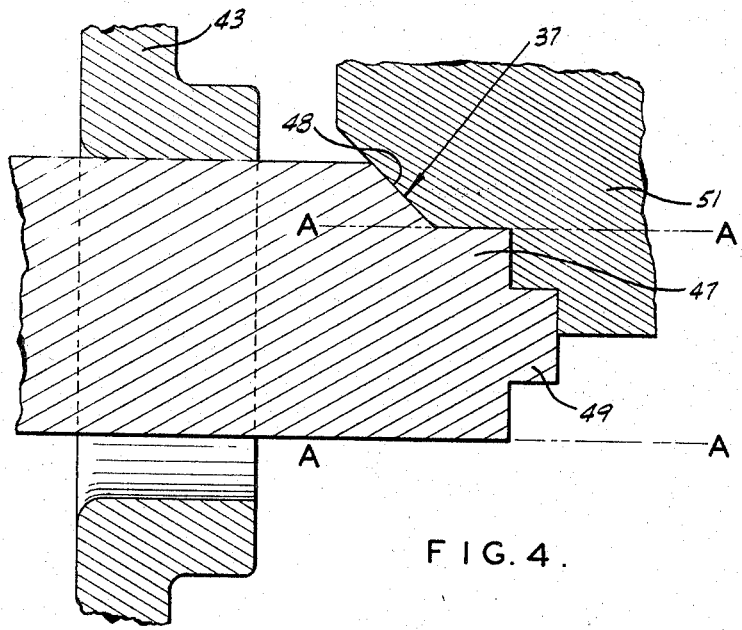
FIGURES 4, 5 and 6 illustrate the succesive steps followed in forming the tip holding socket at one end of the needle body.

Referring to the drawings, FIGURE 1 illustrates in general a carburetor embodying the novel needle valve. The carburetor comprises the basic components of an air horn section 2, a main body section 3, and a throttle outlet section 4. Said sections are secured together and form a mixture conduit 6 defining a stack of venturis 7, 7a and 7b in the main body section. The carburetor is mounted on intake manifold M of a conventional internal combustion engine.

A choke valve 9 is operable to regulate air intake flow, and is rotatably mounted on a choke valve shaft 10 in air horn section 2, which forms the air inlet end of the mixture conduit 6. A throttle valve 8 is rotatably mounted on shaft 15 in the outlet end of mixture conduit 6. Throttle shaft 15, in the normal manner, is fixed to a throttle lever not shown, connected by means of a suitable linkage to a manual control.

The main carburetor body section 3 is provided with a fuel bowl 12 having a fuel inlet 13 to which a screen filter 14 is disposed within inlet recess 13a. A fuel inlet valve 16 includes a needle valve 30 having a tapered forward end 34 shown in contact with a valve seat of a valve body structure 36 to control the fuel flow from inlet 13 to fuel bowl 12.

A float 17 carries float arm 18 pivotably mounted within fuel bowl 12 to actuate needle valve 30 for regulating fuel flow and maintain a substantially constant fuel level within the bowl 12. Fuel is supplied to bowl 12 from a tank 11 by a conventional engine operated fuel pump 20 connected into fuel conduit 25 leading to fuel inlet 13. A fuel metering orifice communicates fuel bowl 12 to an upwardly inclined main fuel passage 21 having a main fuel nozzle 22 opening into the primary venturi 7.

Fuel flow from bowl 12 through orifice 19 into fuel passage 21 is controlled by a metering rod 40 having a stepped end 41 positioned in the metering orifice 19. Movement of rod 40 to vary the disposition of the respective stepped positions in orifice 19 effects a change in fuel flow through said orifice 19. The carbuertor idle fuel system is shown as comprising a fuel well 23 communicated through a passage leading upwardly from fuel passage 21. Well 23 includes a metering tube 24 held therein, communicating with an idle passage 26 having idle ports 27 and 28. An idle adjustment screw 29 is threadably held for insertion in the idle port 28.

Fuel inlet valve 16 includes needle valve 30 formed with an elongated body 32 preferably of noncircular cross section. One end of needle 30 is provided with conical tip 34. The needle opposite end is provided with a rounded or other suitably formed head for engagement by float arm 18. Needle 30 is mounted for reciprocatory movement within a cylinder bore 42 formed in valve body 36. The upper end of the valve body is threaded for detachable engagement with a threaded aperture in a wall of the carburetor for communication to inlet recess 13a.

Valve body 36 is formed with a second cylindrical bore 46 aligned with bore 42 and being smaller in diameter than the latter. Bore 46 defines an annular shoulder 38 with bore 42 to provide a valved seat for abutting engagement with tip 34 of needle 30.

The included angle of the conical tip 34 is preferably within the range of between 60° and 90° to assure proper seating engagement against the relatively sharp annular shoulder 38 of the valve seat.

Under normal operating conditions, liquid fuel is forced by pump 20 from fuel tank 11 through conduit 25, to the inlet 13 of the carburetor. Fuel will thereafter pass through screen filter 14, passages 46 and 42, past needle valve 30 when the float 17 is in a downward position, thus displacing needle 30 from its closed position. When fuel bowl 12 is filled to the desired predetermined level, float lever 17 will urge needle element 30 into engagement with shoulder 38 to define an annular liquid-tight seal and preclude further fuel flow to the carburetor.

During engine operation, fuel normally fills passage 21 to substantially the same level as within bowl 12. Air flow through mixture conduit 6 traverses venturi stack 7, 7a and 7b, establishing a depressed pressure area at the mouth of nozzle 22. Atmospheric pressure on the fuel level in bowl 12 forces fuel up passage 21, and to nozzle 22, to be aspirated from the latter and to mix with air in mixture conduit 6. The flow of air and fuel mixture into engine manifold M is regulated in a well-known manner by the adjusting of the position of throttle valve 8.

As fuel flows from fuel bowl 12 through fuel passage 21 and nozzle 22 respectively, the level of fuel in bowl 12 is decreased, thereby initiating lowering of float 17. Downward movement of float arm 18 permits valve 30 to slide downwardly by its own weight and also due to fuel pressure acting against the formed face of tip 34, thereby permitting fuel flow from inlet 13 into fuel bowl 12.

Tip 34 of needle valve 30 is preferably formed of a synthetic rubber material such as a fluoro-elastomer composition which will remain substantially unaffected by contact with liquid fuel. The use of such a rubberlike material assures a more efficient operation and longer useful life to the carburetor valve. For example, fuel flowing through valve 36 often carries particles of dirt which can become lodged between the engaging surface of tip 34 and the shoulder or annular valve seat 38. The presence of such dirt particles between the adjacent mating surfaces, tends to prohibit closing of the valve with the result that fuel bowl 12 becomes flooded, which fuel then overflows into the engine intake manifold. Forming the valve tip 34 of a rubber-like or similar resilient material enables tip 34 to yield slightly under pressure, thereby enclosing the dirt particle and preventing fuel flow through the valve.

The foregoing description of the carburetor and its normal mode of function is of course a part of the art and included herein to establish a suitable background for the following description directed to the details of the present invention.

In accordance with the invention, elongated needle body 30 is so formed with a socket 33 at one end to be rigidly held in a molding apparatus for applying, forming, and anchoring the resilient tip 34. An essential step in the application of the resilient tip 34 to the needle body is that a portion of socket 33 be urged into firm contact with the mating mold surface. Thus, as fluidized molding material is transferred under pressure into the hollow socket, a tight annular seal about the socket periphery will preclude leakage of liquid material until such time as the latter has solidified. Thereafter the needle body is withdrawn from the mold and permitted to thoroughly cure.

One reason for forming the needle body in the manner to be hereinafter described is to sufficiently form and strengthen the constricted neck of the metallic body, to avoid structural failure during the molding process. A further reason is to provide the body socket with a configuration which will firmly retain the tip in a satisfactory manner and which will eliminate or at least minimize manufacturing cost and difficulties due to tool breakage and machining inaccuracies heretofore experienced.

In accordance with present practice, the elongated metallic body 32 is preferably formed of a metal such as brass, steel, or the like. In order, however, to provide the needed flaring configuration within the socket 33, the socket walls must be sufficiently ductile to provide the necessary peripheral sealing surface.

In brief, the needle body and socket forming operation includes the successive steps of forming a constricted neck portion 37 at one end of the body element, forcefully displacing at least a portion of said constricted neck 37 to create a work hardened peripheral collar having a diameter sufficiently large to receive a resilient tip. Thereafter, the constricted neck 37 is socketed by providing at least one outwardly flared ring 39 extending coaxial with the body and with said displaced neck portion. The body may then be readily aligned with and engage the open mouth of a mold to receive fluidized molding material.

FIGURES 4-7 respectively illustrate a cross sectional representation of the body end during the forming step. Referring to FIGURE 4, the elongated needle body 30 is rigidly held within a gripping device such as a collet 43 or the like. The gripping surface of collet 43 appears to engage only a portion of the needle body outer surface since the latter is normally of non-circular cross section; that is, it may be triangular, square, or the like.

Referring again to FIGURES 3, and 4, the constricted neck portion 37 of the body 30 includes initially a cylindrical section 47 interposed between tapered annular shoulder 48 and an end hub 49 formed co-axial with the body. This configuration at the tip end may be formed as by advancing a first cutting tool either axially or radially into the surface of the body 30 for removing the necessary metal.

Figure 5:
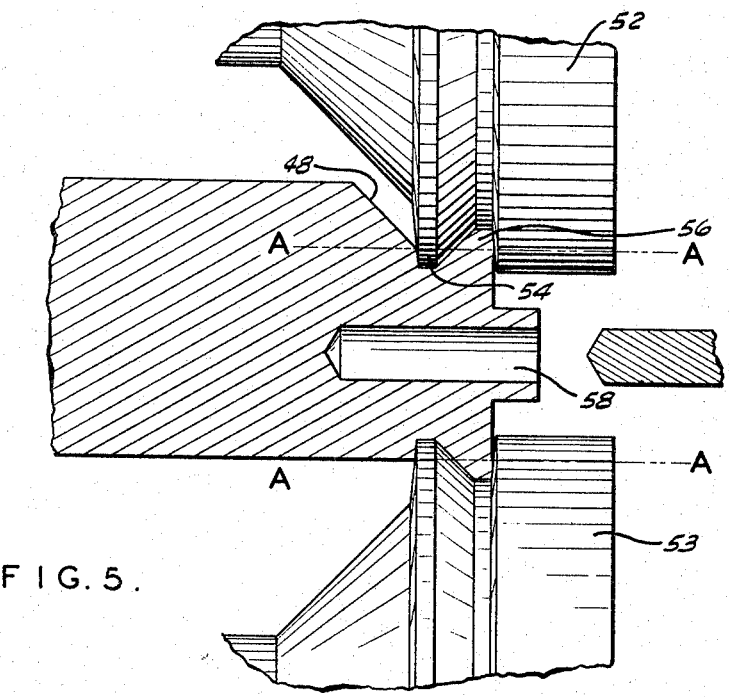

In work hardening of the neck portion 37 to provide said portion with a sufficiently large diameter, the material in the neck is displaced or swaged as shown in FIGURE 5 in such manner to alter the configuration of the neck without substantial removal of metal from the latter. This step includes the application of radial pressure to the tapered shoulder 48, and cylindrical portion 47, through two or more roller elements 52 and 53 having a working surface contoured to the shape of the peripheral surface desired on the neck. Thus, as the respective rolling members 52 and 53 are urged radially into the neck, material will be swaged or displaced from the grooved portion 54 into the outer portion 56. Displacing of the material is of course governed by the configuration of the respective rolling elements to control the dimensions on the body socket and to form an annular collar 57. Simultaneously, during this step, the end hub 49 is bored to a sufficient depth to provide a recess 58 and a thin wall at inlet 63.

Figure 6:
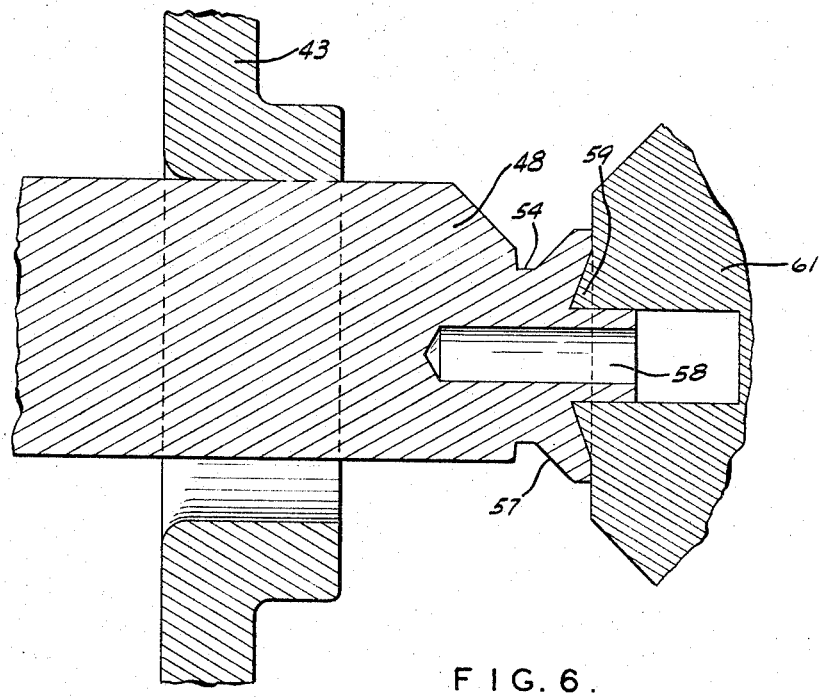

Referring to FIGURE 6, annular collar 57 after the rolling step, is found to be work-hardened due to the previously noted metal displacing action and thus more adaptable to engage a mold surface. To provide a more definite cavity for retaining the resilient tip, collar 57 is channeled on the forward surface to form concave depression 59. This is achieved by advancing an end cutting tool axially into the body end, for channeling the dish-like section substantially concentric with collar 57.

Figure 7:
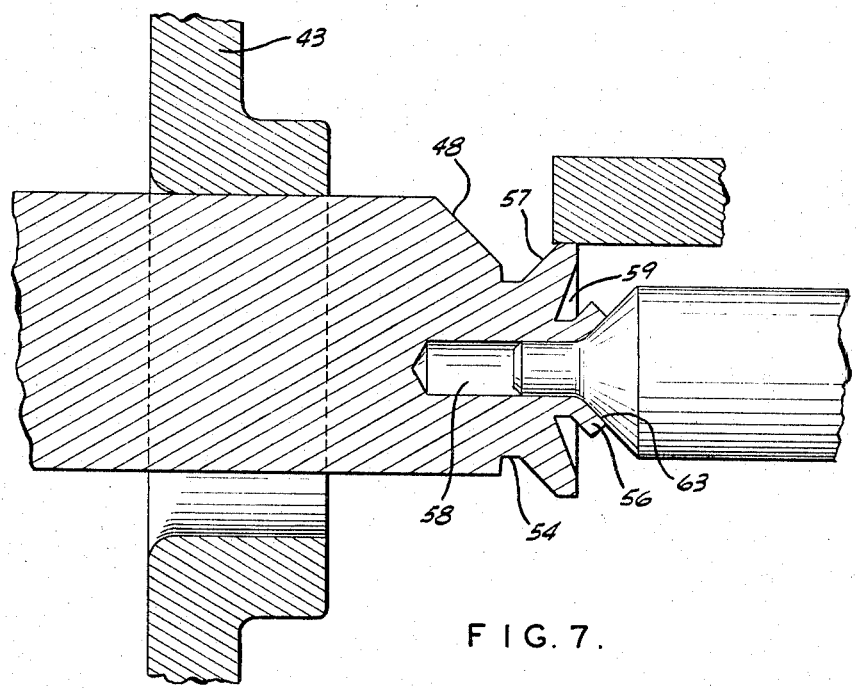

As shown in FIGURE 7, the body end is now subjected to the sequential or simultaneous steps of trimming the work-hardened collar 57 to a uniform outer diameter, and also outwardly flaring the thin walled recess opening 63 formed in hub 49 to provide an overlapping section of the latter adjacent to the dishlike depression 59.

As shown in FIGURE 3, flaring of the thin walled sections of the socket can result in the forming of one or more cracks radiating outwardly in the wall. These cracks are not considered detrimental to the capability of the socket for holding the resilient material, but rather considered advantageous.

Again referring to FIGURE 3, while not presently shown, the tip applying mold is normally brought into engagement with the periphery of collar 57 to form an annular fluid-tight seal prior to the injection of the fluidized resilient material into the socket.

After a sufficient pause to allow said material to become rigidized, the needle body is withdrawn from the mold and permitted to cure at a predetermined temperature for a sufficient length of time to avoid undue distortion or other wrinkling along the resilient tip surface.

In providing the presently disclosed enlarged collar onto which the resilient tip is molded, the present method of forming the collar will in a known manner, alter the characteristics of the material due to the herein mentioned cold working step. This step of cold working will have the tendency of increasing the tensile strength of the material is well as the yield strength. Physically, the molecular structure of the metal will be distorted due to the operation in that the grain size will be decreased to some degree.

While the primary purpose of the presently disclosed method is for forming an enlarged collar on the needle body, it is understandable that altering the physical characteristics of the collar provides in effect a stronger base to which the rubber tip might be molded. The molding process is further substantially simplified. For example, it is possible to apply a greater contact pressure between the mold surface and the tip socket without distortion of the latter thereby assuring a more positive annular seal to prevent flashing of molding material during the molding step.

While this altering of the physical characteristic of one end of the tip may be advantageous with respect to certain metals, it does not necessarily hold true for all materials of which the tip might be fabricated. It is possible, therefore, that after the formation of the enlarged collar on the tip as herein noted, the needle body or tip itself might be subjected to further thermal treatment to relieve internal stresses; that is, by stress relieving or by an annealing process. In either instance, the metal tip will be restored substantially to its original physical condition prior to the molding step.

As is clear from the foregoing description of the novel needle valve structure and method for its manufacture, the present invention embodies a number of advantages heretofore lacking in the prior art. Notably, with the provisions of the strengthened neck at the needle body end, there is no longer the large percentage of needle bodies fabricated which heretofore were rejected as being unsuitable for use. Further, the work hardened end of the needle body formed by the collar permits a more thorough and accurate seal of the body to the mold during the molding step.

It should be understood by those familiar with the art that the foregoing description is exemplary of the novel needle valve element and its method of manufacture. It is further understood that changes and modifications may be made in both the valve element and and in the method of manufacture herein discussed without departing from the spirit and scope of the invention.

We claim:

1. The method of forming a valve member adapted to be slidably received in a valve opening, said member having a resilient tip for movably engaging a valve seat disposed in said valve opening to define an annular fluid tight seal and to regulate flow of fluid through said opening, the steps therein for forming said member consisting of:

(1) providing an elongated solid metallic valve element having opposed ends and a non-circular peripheral surface,
    (2) constricting a portion of said elongated valve element at one of said ends to form a neck,
    (3) displacing radially outwardly the metal in at least a part of said constricted neck portion at said one end to define an enlarged collar by applying radially inwardly directed forces thereto,
    (4) forming a socket in the end face of said valve element adjacent to and through said enlarged collar, and
    (5) applying a thermo-setting material to said socket and said collar to engage the latter and form a resilient seal.

2. The method of forming a valve member as defined in claim 1 including the step of forming a cavity in the surface of said enlarged collar on the side thereof adjacent to said socket.

3. The method as defined in claim 1 including the step of providing an axial bore in said elongated valve element at said one end thereby defining a thin walled cylindrical projection depending centrally from said collar, and outwardly flaring said wall of said cylindrical projection to overhang a portion of the cavity formed in said collar.

4. The method as defined in claim 1 including the steps of:

(1) forming a cavity in the lateral surface of said enlarged collar adjacent to said socket,
    (2) providing an axial bore in said valve element at said one end to define a thin walled cylindrical projection depending axially from said collar, and
    (3) outwardly flaring the walls of said projection to overhang a portion of the cavity formed in the lateral surface of said collar.

5. The method as defined in claim 1 including the step of forming a thin walled bore extending axially of said valve element and having an inlet at said end face, and radially deflecting the thin wall of said bore to enlarge said inlet to a diameter not substantially exceeding the peripheral diameter of said collar.

6. The method of forming an elongated valve member adapted to be slidably received in a valve body passage, said member having a resilient tip for engaging a valve member in said passage to define an annular fluid tight seal therewith and to regulate fluid flow through said opening, the steps therein for forming said valve member consisting of:

(1) providing an elongated solid metallic body having longitudinally extending and peripherally spaced slide surfaces, and an end face,
    (2) constricting one end of said valve body adjacent said end face to a cross sectional diameter not substantially exceeding the smallest cross sectional diameter of said body,
    (3) radially inwardly swaging a portion of said constricted one end to radially outwardly displace metal therein and form an enlarged collar at said one end,
    (4) forming a socket in said body end face adjacent to and through said enlarged collar, and
    (5) applying a thermo-setting plastic material to said socket and said collar.

7. A method as defined in claim 6 including the step of axially confining a portion of said body constricted end while swaging said portion to urge displaced metal radially outwardly.

8. A method as defined in claim 6 wherein the step of constricting said body one end consists of:

(1) forming a cylindrical portion immediately adjacent body end face, and (2) forming a generally conical section having a smaller diameter terminating at said cylindrical portion and a larger diameter terminating at said guide surface.

9. In a method as defined in claim 6 wherein the step of forming said socket consists of:
(1) forming a bore in said body end face to define a thin walled cylindrical hub adjacent said collar and having an opening at the bore end face,
(2) laterally displacing the walls of said hub outwardly to enlarge said bore opening.

10. In a method as defined in claim 6 including the step of forming a concave cavity in the lateral surface of said enlarged collar adjacent to said body end face.

References Cited
UNITED STATES PATENTS

| | | | |
|---|---|---|---|
| 2,393,751 | 1/1946 | Chott | 29—527 |
| 2,580,668 | 1/1952 | Franz. | |
| 3,086,750 | 4/1963 | Carlson et al. | |
| 3,090,108 | 5/1963 | Gifford | 29—156.7 |
| 3,317,183 | 5/1967 | Szwargulski | 251—358 X |
| 3,326,520 | 6/1967 | Guenther | 251—358 |
| 3,326,521 | 6/1967 | Murray | 251—358 |

CHARLIE T. MOON, *Primary Examiner.*